US011260956B2

(12) United States Patent
Hermel et al.

(10) Patent No.: US 11,260,956 B2
(45) Date of Patent: Mar. 1, 2022

(54) LEADING EDGE SLAT WITH OPTIMIZED STRUCTURE

(71) Applicant: DAHER AEROSPACE, Saint Julien de Chedon (FR)

(72) Inventors: Pascal Hermel, Blagnac (FR); Luc Gautrand, Labarthe sur Leze (FR); François Bauvir, Colomiers (FR); Arnaud Cazelles, Toulouse (FR); David Clech, Toulouse (FR)

(73) Assignee: DAHER AEROSPACE, Saint Julien de Chédon (FR)

( * ) Notice: Subject to any disclaimer, the term of this patent is extended or adjusted under 35 U.S.C. 154(b) by 145 days.

(21) Appl. No.: 16/727,189

(22) Filed: Dec. 26, 2019

(65) Prior Publication Data

US 2020/0207458 A1    Jul. 2, 2020

(30) Foreign Application Priority Data

Dec. 28, 2018 (FR) ..................................... 18 74356

(51) Int. Cl.
| | |
|---|---|
| *B64C 3/26* | (2006.01) |
| *B64C 3/18* | (2006.01) |
| *B29L 31/30* | (2006.01) |
| *B64C 1/12* | (2006.01) |
| *B64C 1/00* | (2006.01) |

(52) U.S. Cl.
CPC ................ *B64C 3/26* (2013.01); *B64C 3/185* (2013.01); *B29L 2031/3082* (2013.01); *B29L 2031/3085* (2013.01); *B32B 2605/18* (2013.01); *B64C 1/12* (2013.01); *B64C 3/187* (2013.01); *B64C 2001/0072* (2013.01)

(58) Field of Classification Search
CPC .... B64C 3/26; B64C 3/28; B64C 3/18; B64C 3/185; B64C 1/12
See application file for complete search history.

(56) References Cited

U.S. PATENT DOCUMENTS

| | | | | |
|---|---|---|---|---|
| 5,366,177 | A  * | 11/1994 | DeCoux | B64C 21/06 244/201 |
| 6,119,978 | A  * | 9/2000 | Kobayashi | B21D 26/055 244/134 R |
| 7,923,096 | B2 * | 4/2011 | Starke | B32B 3/28 428/178 |

(Continued)

FOREIGN PATENT DOCUMENTS

| | | |
|---|---|---|
| EP | 2 522 572 A1 | 11/2012 |
| EP | 3 242 790 B1 | 11/2019 |
| JP | 2003 291895 A | 10/2003 |

*Primary Examiner* — Michael H Wang
(74) *Attorney, Agent, or Firm* — Im IP Law; Chai Im; C. Andrew Im

(57) ABSTRACT

A leading edge slat of a wing element of an aircraft. The aircraft defining a mark including a main fuselage axis x and a spanwise axis y. The wing procuring a lift along an axis z. The wing element having a skin forming the leading edge slat, a spar linked to the skin and a stiffening structure linked on the leading edge side to the spar and to the skin. The stiffening structure being formed from a formed sheet metal having a plurality of bosses distributed according to the length of the leading edge. The bosses extending between the spar and the inner face of the skin.

4 Claims, 1 Drawing Sheet

(56) References Cited

U.S. PATENT DOCUMENTS

| | | | | |
|---|---|---|---|---|
| 8,322,657 | B2* | 12/2012 | West | B64C 3/28 |
| | | | | 244/123.1 |
| 8,800,924 | B2* | 8/2014 | Groves | B64C 3/22 |
| | | | | 244/123.1 |
| 9,340,274 | B2* | 5/2016 | Starke | B64C 1/12 |
| 9,708,030 | B1* | 7/2017 | Gabrys | B63B 1/244 |
| 2004/0237763 | A1* | 12/2004 | Bhatnagar | F41H 5/0485 |
| | | | | 89/36.02 |
| 2005/0281987 | A1* | 12/2005 | Starke | B32B 3/28 |
| | | | | 428/180 |
| 2010/0116943 | A1* | 5/2010 | Meister | B64C 21/08 |
| | | | | 244/208 |
| 2016/0159465 | A1* | 6/2016 | Koppelman | B64C 21/06 |
| | | | | 244/209 |
| 2016/0339668 | A1* | 11/2016 | Abe | B32B 27/38 |
| 2017/0174313 | A1* | 6/2017 | Brakes | B64C 3/28 |
| 2017/0326817 | A1* | 11/2017 | Portet | B33Y 70/00 |

* cited by examiner

LEADING EDGE SLAT WITH OPTIMIZED STRUCTURE

RELATED APPLICATION

This application claims priority from French Patent Application no. 18 74356 filed Dec. 28, 2018, which is incorporated herein by reference in its entirety.

TECHNICAL FIELD

The invention relates to a leading edge slat of an aircraft wing such as a drooping leading edge slat, of which the structure of the slat is optimized.

More particularly the invention relates to a stiffening structure of such a leading edge slat.

BACKGROUND OF THE INVENTION

The wing leading edge slats are present on an aircraft on the horizontal planes, wings and horizontal planes of the fin, as well as on the vertical planes such as on the fin.

The slats present on an aircraft wing, are drooping leading edges which make it possible, through their controlled displacement, to modify the aerodynamic flow around the wing and to modify the list thereof at a given speed.

A civil transport aircraft generally comprises 3 to 5 slats distributed over the leading edges of the wings, from the root of the wing to the tip, which follow the change in the section of the wing between the two ends thereof.

A slat is thus a lifting surface of the wing which can recover, at a given spanwise position, up to 30% of the total lift of the wing section.

The FIG. 1 diagrammatically shows the section, in the plane x-z of a slat according to prior art. The axis system shown is that of the aircraft the fuselage extends parallel to the X axis and the wing substantially according to the Y axis.

Such a slat comprises an upper surface skin (110) extending from the leading edge (slat) to the trailing edge. Which is, according to certain embodiments, formed from several portions.

A spar (120) is assembled to the upper surface skin (110) to which ribs are linked.

An inner skin (130) is linked to the upper surface skin (110) by the intermediary of a stiffening system (140) such as rails, ribs, even a honeycomb structure according to the embodiment.

Several ribs distributed along the axis y, are linked to the spar and to the upper surface skin creating a box structure, on the leading edge side as well as on the trailing edge side.

The slat is linked to the wing by the intermediary of one or several interface fittings (not shown) connected by the intermediary of maneuvering arms or rails to mechanical or hydraulic actuator means in order to carry out the relative controlled displacement of the slat in relation to the wing.

The structure diagrammatically shown in FIG. 1 corresponds to an example of metallic construction, but the constructions made of composite of prior art are similar.

This mechanical design has changed little.

In terms of rigidity, a slat has to be sufficiently rigid to resist the aerodynamic forces.

The aerodynamic forces that the slat is subjected to are transferred to the wing via the interface fittings and the maneuvering arms or rails which must consequently be dimensioned according to the number of fittings.

When a slat is linked to the wing by more than two interface fittings, the differences in the deformed shape between the wing and the slat produce overstressing in the interface fittings and the maneuvering elements, which is all the more so substantial when the number of interface fittings is high.

Indeed, when the connection of the slat with the wing comprises more than two fittings, which is frequent, the mounting is hyperstatic. This hyperstatism combined with the differences in deformed shapes is responsible for half of the forces to which said fittings and the slat are subjected to, with the rest coming from the aerodynamic load.

This phenomenon requires dimensioning the interface fittings and the maneuvering means in consequence which has an influence on the mass, and increases the risk of binding or jamming, which have to be taken into account in the dimensioning.

Moreover, the leading edges of the wing elements are exposed to impacts, in particular to impacts with birds.

In a conventional design such as shown in FIG. 1, the skin that forms the leading edge slat, is linked to the spar and stiffened by straight ribs (150) perpendicular to the spar. According to embodiments up to 18 ribs are thus distributed along the axis y between the spar and the skin forming the leading edge, thus forming a structure with multiple boxes.

According to an embodiment of a slat, each one of these ribs (150) weighs approximately 200 grams which is a total weight that can be attributed to this stiffening of about 3.6 kg.

In case of impact, on the slat, these straight ribs, highly rigid generate a direct transfer of the energy of the impact to the spar.

The majority component of the impact speed of an object or of a bird on the leading edge is parallel to the axis x and corresponds to the displacement speed of the aircraft.

Due to the substantial stiffness of the ribs (150) in the direction x, these ribs do not favor the distribution of the energy of the impact. The risk is damage to the spar.

In the case where the spar is damaged, the residual resistance of the structure after impact is called into question.

Multiplying the ribs, in addition to the increase in the mass, increases the rigidity of the slat and reduces its ability to follow the deformations of the wing, increasing the efforts of interface linked to the differences in the deformation between the wing and the slat.

In addition, this architectural solution of prior art is even more unfavorable with regards to the resistance in terms of the resistance to an impact in the case of a construction made from a composite material, of the type of material that has a rupture energy absorption capacity, at the same rigidity, less than that of metallic materials.

The document U.S. Pat. No. 9,708,030 describes a leading edge slat of which the structure is optimized for the resistance to impacts and which comprises teeth that aim to improve the resistance to the pulling off of the leading edge.

OBJECT AND SUMMARY OF THE INVENTION

The invention aims to overcome the disadvantages of prior art and relates for this purpose to a leading edge slat of a wing element of an aircraft, said aircraft defining a mark that comprises a main fuselage axis x and a spanwise axis y, with the wing element procuring a lift along an axis z, comprising a skin forming the leading edge slat, a spar linked to said skin and a stiffening structure linked on the leading edge side to said spar and to the skin, wherein the stiffening structure is formed from a formed sheet metal comprising a plurality of bosses distributed according to the length of the leading edge, said bosses extending between the spar and the inner face of the skin and wherein the bosses form domes that comprise a zone in contact with the skin and tangent to the latter, the hollows between the bosses being in contact with the spar and tangent to the latter. In comparison with prior art, this stiffening structure makes it possible to distribute the energy of the impact over a larger surface, which limits the risks of degradation of the spar, but also in a more substantial volume of material, making this solution compatible with a composite construction, while still retaining facility in terms of assembly.

The invention is implemented according to the embodiments and alternatives disclosed hereinafter, which are to be considered individually or according to any technically operable combination.

According to an embodiment, said slat is a moving leading edge slat. In this embodiment and in comparison with prior art, the stiffening procured by the structure object of the invention is less at an equal impact absorption capacity, thus favoring the following of the deformations of the wing and limiting the deformation incompatibility stresses.

Advantageously, the flanks of the bosses form an angle less than 90° in relation to the surface of the spar and to the surface of the skin. The inclination of the flanks of the bosses favors the absorption of the energy of the impact through the stiffening sheet metal as well as through the skin forming the leading edge slat.

According to an embodiment, the stiffening structure is formed from a composite material with continuous fibers in a thermoplastic matrix. This embodiment makes it possible to lighten the structure, by taking advantage of the best distribution of the energy of the impact to allow for a construction made of composite material.

Advantageously, the skin forming the slat and the spar are also formed from a composite material with continuous fibers and with a polymer matrix, and the stiffening structure is linked to the spar and to the skin by welding. This embodiment allows for a gain in mass and facilitates assemblies.

According to a particular embodiment, the pitch of the bosses is variable over the length of the leading edge slat.

BRIEF DESCRIPTION OF THE DRAWINGS

The invention is disclosed hereinafter according to its preferred embodiments, which are in no way limiting, and in reference to FIGS. 1 to 3 wherein.

DETAILED DESCRIPTION OF THE EMBODIMENTS

Figure 1:
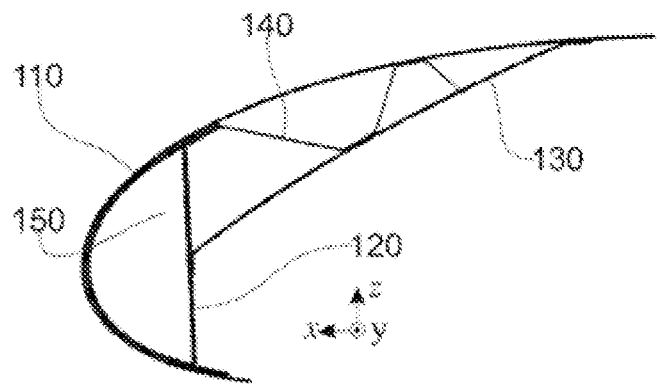
FIG. 1 shows, according to a cross-section view, a diagrammatical example of a slat according to prior art.
Figure 2:
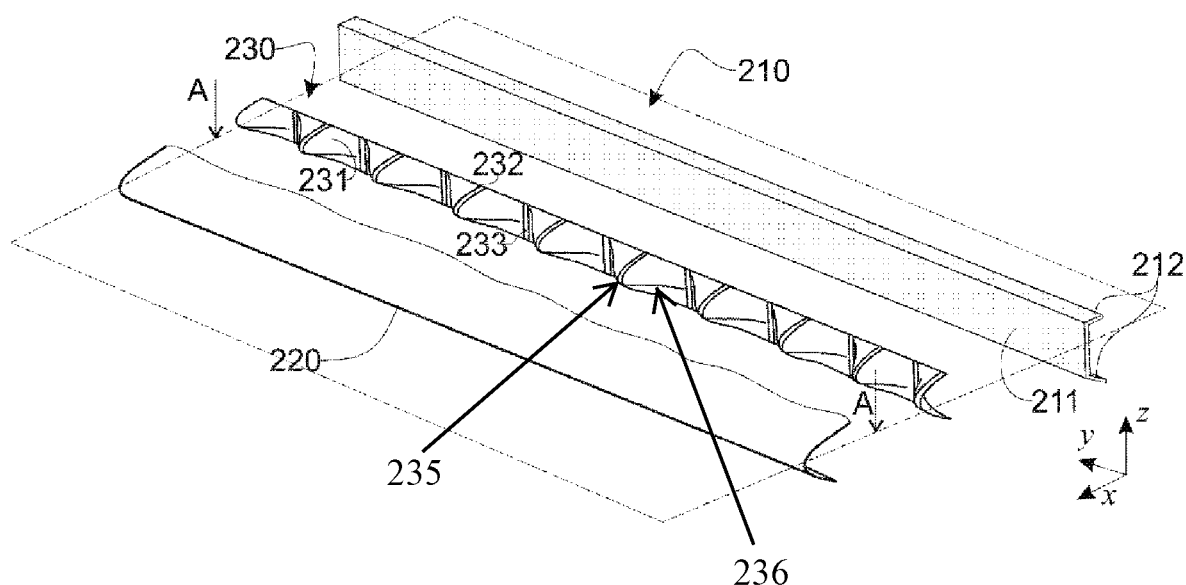
FIG. 2 shows according to a perspective and exploded view, an embodiment of a leading edge according to the invention.

FIG. 2, according to an embodiment, corresponding for example to the leading edge of a slat, the structure of a leading edge according to the invention, comprises a spar (210) with a section substantially in the shape of a U, and a skin (220), partially shown in FIG. 2, forming the leading edge. The skin extends from a single part or in several assembled portions, on the upper surface side and on the lower surface side.

The spar (210) comprises a core (211) extending in the plane y-z according to this embodiment and soles (212) on either side of the core.

The spar (210) and the skin (220) are linked by the soles (212) of the spar on the upper surface and lower surface sides by riveting or by welding according to the embodiments.

According to the alternative embodiments the spar (210) and the skin (220) are formed from a metallic material, for example an aluminum alloy or are formed from a continuous reinforced composite in a thermosetting or thermoplastic polymer matrix.

A stiffening structure (230) extends between the skin (220) and the spar (210) it is fastened on the one hand to the core (211) of the spar and on the other hand to the inner face of the skin.

The stiffening structure (230) is a sheet metal comprising a plurality of bosses (231), distributed over the length, here the axis y, of the leading edge.

Each boss (231) forms a dome that comprises, on the skin side, a zone (232) tangent to the inner surface of the skin, and to the hollows between two bosses, a zone (233) tangent to the surface of the core (211) of the spar.

None of the flanks (236) of the domes (235) that constitute the bosses (231) are parallel to the normal to the core of the spar, in such a way that no surface of said domes (235) is parallel to the main component of the speed vector, directed substantially according to the X axis, of an object impacting the leading edge.

According to this embodiment, the stiffening structure comprises 9 domes (235) distributed along a regular pitch along the axis y. It advantageously replaces 9 straight ribs between the spar and the leading edge skin.

Alternatively, the pitch of the bosses is variable and preferably increases along an axis y by moving away from the root of the wing element in such a way as to adapt the stiffening to the rigidity of said wing element.

According to an embodiment, the stiffening structure is formed from a formed sheet metal by of aluminum alloy. Such a form is obtained by hydroforming, superplastic forming or by incremental forming.

By way of a non-limiting example, the sheet metal has a thickness of 1 mm and weighs about 500 grams, thus representing a gain of 1.3 kg in relation to a solution of prior art implementing 9 straight ribs of 200 grams each.

According to another embodiment the stiffening structure (230) is formed from a composite material comprising a continuous reinforcement, for example in the form of carbon fibers, in a thermoplastic polymer matrix for example made from polyetheretherketone (PEEK).

Using a thermoplastic polymer matrix provides superior resistance to the impact in comparison with a thermosetting matrix.

According to this composite configuration, the stiffening structure (230) is advantageously assembled to the spar (210) and to the skin (220) by welding, with the latter also being of a composite structure.

The welding is carried out using ultrasound or by bringing the assembly to be assembled to a suitable temperature in a tool. If one of the skin or the spar is comprised of a composite with a thermosetting matrix, a thermoplastic film that can bind with the polymer forming the matrix of this element is deposited beforehand on the surfaces that correspond to the assembly zones.

According to an embodiment this film is deposited by an additive manufacturing method according to a method such as described in document EP 3 242 790.

According to this embodiment of the stiffening structure made of composite material, the pitch of the bosses as well as the angles of their flanks (236) are chosen in such a way as to facilitate the passage of a fiber placement head for the realization thereof.

Figure 3:
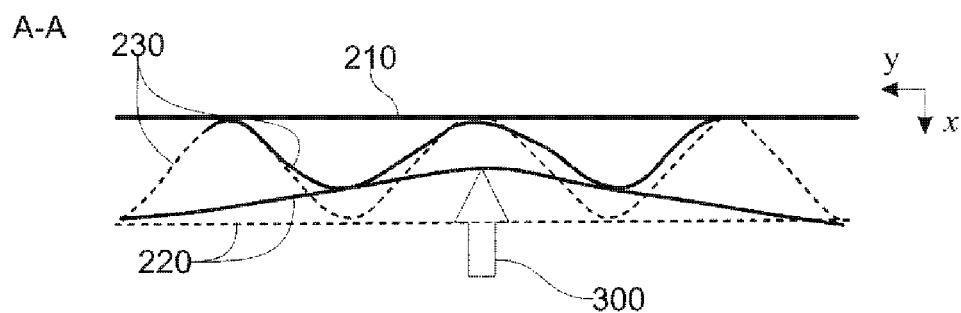
FIG. 3 diagrammatically shows according to a cutting plane AA shown in FIG. 2, the response of the structure of FIG. 2 during an impact, with as a dotted line the shape of the elements before impact and as a solid line the deformation of these elements during the impact.

FIG. 3, in case of impact on the structure object of the invention with a direction of impact (300) of which the main component is oriented along the X axis, the deformation of the skin (220) solicits the deformation of several bosses of the stiffening structure (230) thus distributing the energy of the impact in a substantial volume of material and the reaction force on a substantial surface of the spar (210) which is thus preserved.

Due to the inclination of the flanks of the bosses, the more substantial the penetration of the impinger according to x is, the higher the number of bosses affected by the deformation is, which all the more so increases the dissipation capacities of the energy of the impact.

The plastic deformation of the skin (220) and of the stiffening structure (230) when the latter are formed from a metallic material, or their degradation via delamination when they are formed from a composite material, thresholds the force transmitted to the spar over a large distance of displacement of the impinger, practically until the latter reaches the spar.

The description hereinabove shows that the leading edge structure according to the invention allows for: a gain in mass, better resistance to the impact and a stiffening that better preserves the deformation compatibility between the leading edge and the wing element when this leading edge is movable.

In addition, the structure objet of the invention opens the possibility of realizing a leading edge according to a composite construction able to respond to the impact resistance requirements.

The invention claimed is:

1. A leading edge slat of a wing element of an aircraft, said aircraft defining a mark comprising a main fuselage axis x and a spanwise axis y, the wing element procuring a lift along an axis z, the wing element comprising a skin forming the leading edge slat, a spar comprising a core extending in a y-z plane and soles on either side of the core, the spar being linked to the skin by the soles and a stiffening structure linked on a leading edge side to the spar and to the skin, the stiffening structure being formed from a formed sheet metal comprising a plurality of bosses distributed according to a distribution pitch along a length of the leading edge slat, the plurality of bosses extending between the spar and an inner face of the skin, wherein the plurality of bosses is a succession of domes and hollows connected by flanges, each dome comprising a zone in contact with the skin and tangent to the skin, each hollow between two domes being in contact with the core of the the spar and tangent to the core of the spar and wherein any surface of any flank forms an angle less than 90° in relation to a surface of the core of the spar and to a surface of the skin with which the domes are in contact.

2. The leading edge slat according to claim 1, wherein the leading edge slat is a movable leading edge slat.

3. The leading edge slat according to claim 1, wherein the skin forming the slat and the spar are made of a composite material with continuous fibers in a polymer matrix, and wherein the stiffening structure is linked to the spar and to the skin by welding.

4. The leading edge slat according to claim 1, wherein the distribution pitch of the bosses varies over the length of the leading edge slat.

* * * * *